US012380296B1

(12) United States Patent
Pang et al.

(10) Patent No.: US 12,380,296 B1
(45) Date of Patent: Aug. 5, 2025

(54) SYSTEMS AND METHODS UTILIZING COMPUTER VISION TO DETECT A HANDHELD INDICIA READER

(71) Applicant: ZEBRA TECHNOLOGIES CORPORATION, Lincolnshire, IL (US)

(72) Inventors: Robert James Pang, Williston Park, NY (US); Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/791,294

(22) Filed: Jul. 31, 2024

(51) Int. Cl.
*G06K 7/10* (2006.01)
(52) U.S. Cl.
CPC ..... *G06K 7/10712* (2013.01); *G06K 7/10792* (2013.01); *G06K 2007/10524* (2013.01)
(58) Field of Classification Search
CPC .................................................. G06K 7/10792
USPC .................................................. 235/462.42
See application file for complete search history.

(56) References Cited

U.S. PATENT DOCUMENTS

2024/0256805 A1* 8/2024 Barkan .............. G06K 7/10732

* cited by examiner

*Primary Examiner* — Toan C Ly
(74) *Attorney, Agent, or Firm* — Yuri Astvatsaturov

(57) ABSTRACT

Systems and methods for item detection are disclosed herein. The system comprises a fixed data capture assembly, a handheld indicia reader, a processor, and a memory. The fixed data capture assembly has a first field of view (FOV) associated with an item scanning region and a second FOV associated with a data capture region extending at least partially outside the item scanning region. The processor executes instructions stored in the memory causing the system to: detect an item within the data capture region and outside of the item scanning region; responsive to detecting the item, determine whether the item remains outside the item scanning region during a first time period; responsive to determining that the item remains outside the item scanning region during the first time period, determine whether the handheld indicia reader is utilized; and responsive to determining that the handheld indicia reader is not utilized, trigger an alert associated with non-scanning of the item.

24 Claims, 13 Drawing Sheets

SYSTEMS AND METHODS UTILIZING COMPUTER VISION TO DETECT A HANDHELD INDICIA READER

BACKGROUND

Facilities (e.g., retail facilities) deploy self-checkout stations with increasing frequency to expedite and improve a purchase experience of a customer. For example, conventional and proposed self-checkout stations include those with integrated and monitored bagging areas, conveyor belt systems that attempt to automatically scan items moving across a scan field regardless of item orientation, and simultaneous scan stations that attempt to scan a collection of items all at once by locating the items together under the field of view of an imager. However, conventional and proposed self-checkout stations do not account for exceptions during the self-checkout process including, but not limited to, an item that is too heavy and/or bulky to place on a conveyor belt or present to a scanner (e.g., a single plane scanner, a multiplane scanner, a gateway scanner, or any suitable scanner), an item missing a barcode, and an item that is not visible in a scan field or by the field of view of an imager. These exceptions delay the self-checkout process and frustrate the purchase experience of a customer. As such, conventional and proposed self-checkout stations do not provide a sufficiently frictionless solution that expedites and improves a purchase experience of a customer by reducing and/or streamlining one or more self-checkout processing steps by automatically addressing exceptions during the self-checkout process.

SUMMARY

In an embodiment, the present invention is a system for item detection in a retail environment. The system comprises a fixed data capture assembly, a handheld indicia reader, a processor, and a memory. The fixed data capture assembly has a first field of view (FOV) associated with an item scanning region and a second FOV associated with a data capture region extending at least partially outside the item scanning region. The memory is communicatively coupled to the processor and stores instructions. The instructions, when executed by the processor, cause the system to: detect, by the processor, an item within the data capture region and outside of the item scanning region; responsive to detecting the item, determine whether the item remains outside the item scanning region during a first time period; responsive to determining that the item remains outside the item scanning region during the first time period, determine whether the handheld indicia reader is utilized; and responsive to determining that the handheld indicia reader is not utilized, trigger an alert associated with non-scanning of the item.

In an embodiment, the present invention is a fixed data capture assembly for item detection in a retail environment. The fixed data capture assembly comprises a first field of view (FOV) associated with an item scanning region and a second FOV associated with a data capture region extending at least partially outside the item scanning region; a processor; and a memory. The memory is communicatively coupled to the processor and stores instructions. The instructions, when executed by the processor, cause the processor to: detect an item within the data capture region and outside of the item scanning region; responsive to detecting the item, determine whether the item remains outside the item scanning region during a first time period; responsive to determining that the item remains outside the item scanning region during the first time period, determine whether a handheld indicia reader is utilized; and responsive to determining that the handheld indicia reader is not utilized, trigger an alert associated with non-scanning of the item.

In an embodiment, the present invention is a method for item detection in a retail environment. The method comprises detecting, by a fixed data capture assembly having a first field of view (FOV) associated with an item scanning region and a second FOV associated with a data capture region extending at least partially outside the item scanning region, an item within the data capture region and outside of the item scanning region; responsive to detecting the item, determining whether the item remains outside the item scanning region during a first time period; responsive to determining that the item remains outside the item scanning region during the first time period, determining whether a handheld indicia reader is utilized; and responsive to determining that the handheld indicia reader is not utilized, triggering an alert associated with non-scanning of the item.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
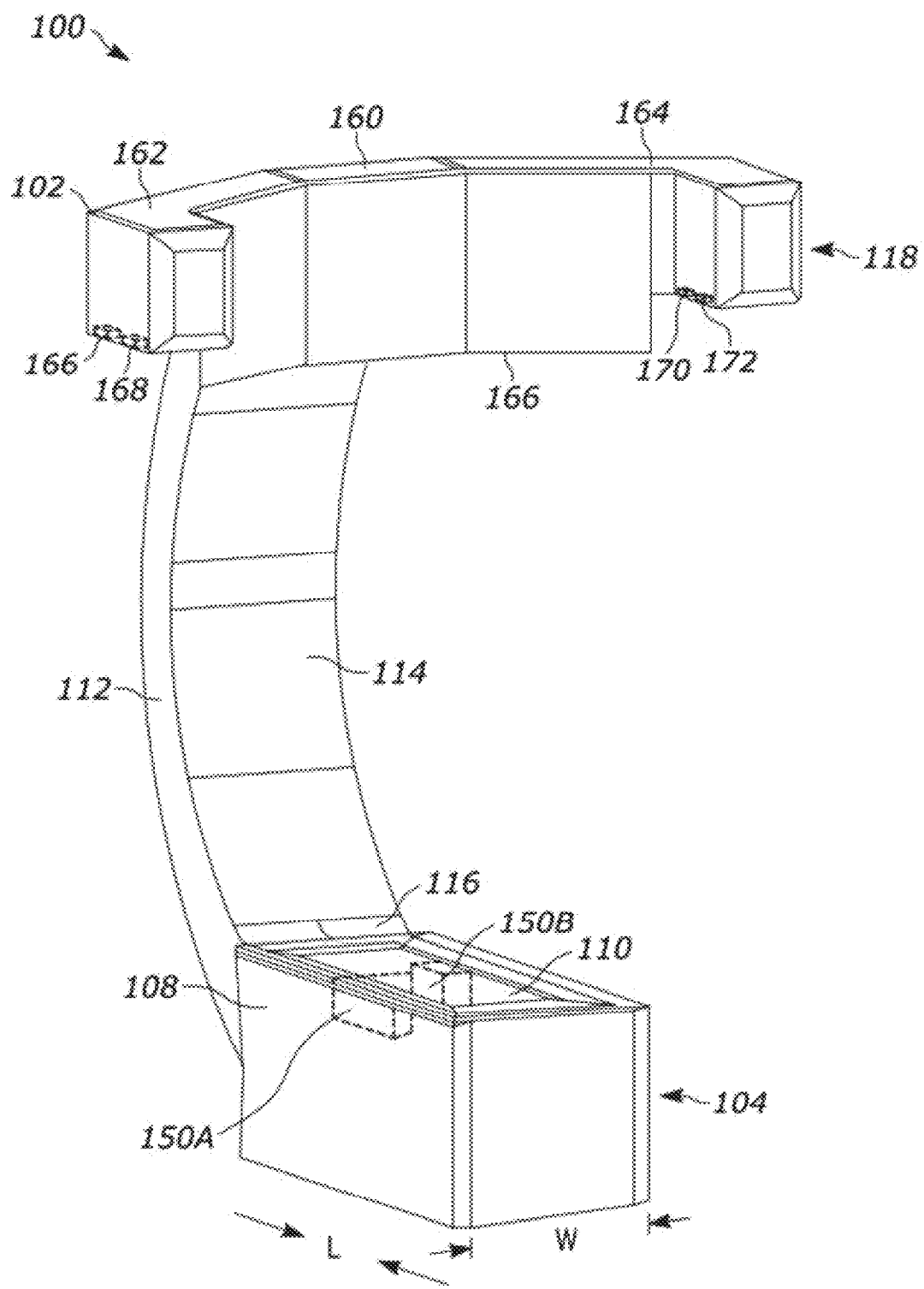
FIGS. 1A and 1B illustrate perspective views of a gateway scanner with two branching arms.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, a system is provided having a scanner with a scan surface and multiple imagers with overlapping fields of view over the scan surface and adjacent to the scan surface, including one or more upwardly directed imagers and one or more downwardly directed imagers. A scanner may include, but it not limited to, a single plane scanner, a multiplane scanner, a gateway scanner or any suitable scanner. The scanner may be a standalone scanner, or a scanner integrated into a point of sale (POS) station. For example, the scanner may be positioned on a top surface of a countertop of a POS station or within the countertop of the POS station. The downwardly directed imagers may be a fixed data capture assembly positioned above the scanner. The fixed data capture assembly may have a first FOV that corresponds to one of a downwardly directed looking vision camera assembly, an infrared (IR) sensor assembly, or a lidar sensor assembly comprising at least one imager configured to scan an indicia associated with an item within an item scanning region and a second FOV that corresponds to a downwardly directed looking vision camera assembly configured to detect the item within a first data capture region (e.g., a shopping cart area, a basket area, a flatbed cart area, a countertop area, etc.) In an embodiment, the scanner may be a standalone scanner such that the upwardly directed imagers are positioned in a lower portion of the scanner and at least one downwardly directed imager (e.g., a fixed data capture assembly corresponding to a downwardly directed looking vision camera assembly configured to scan an indicia associated with an item within an item scanning region and detect the item within a first data capture region) is positioned above the scanner and is independent of the scanner. In another embodiment, the scanner may be integrated such that the upwardly directed imagers are positioned in a lower portion of the scanner and at least one downwardly directed imager (e.g., fixed data capture assembly corresponding to a downwardly directed looking vision camera assembly configured to scan an indicia associated with an item within an item scanning region and detect the item within a first data capture region) is positioned in an upper portion, where the bottom and upper portions are connected via an integrated extension arm. In various examples, these scanners provide a narrow profile scanner design that is of a sufficiently small form factor to allow for space between a first data capture region (e.g., a shopping cart area, a basket area, a flatbed cart area, a countertop area, etc.) and a second data capture region (e.g., a bagging area), such that a customer can quickly scan items from one region to the other, in a frictionless manner, without concern for orientation of the item, as the multiple imagers are positioned to detect barcodes on an item regardless of an orientation thereof.

In an embodiment a scanner and a fixed data capture assembly thereof or communicatively coupled thereto can include wide angle fields of view that may extend partially or fully into a first data capture region (e.g., a lead-in region including, but not limited to, a shopping cart area, a basket area, a flatbed cart area, and a countertop area) and a second data capture region (e.g., a lead-out region such as a bagging area). Thus, in some examples, systems are provided that can image a shopping cart area and a bagging area to capture image data that can be further used in self-checkout scanning operations, in addition to the image data capture over the scanning region between those two areas. Additionally, in an embodiment, a system can include one or more integrated components (e.g., a computer terminal, a handheld barcode reader, and a display) that may reduce and/or streamline one or more self-checkout processing steps by automatically addressing exceptions during the self-checkout process. For example, the keypad (e.g., a transaction input terminal) may be integrated with the scanner or mounted to the scanner to allow a user to input transaction related information. In another example, the handheld barcode reader may be utilized by a user to scan an indicia of an item that is too heavy and/or bulky to present to the scanning region. In yet another example, the display may be independent of or integrated with the scanner and may provide feedback (e.g., a known location of an indicia of an item, steps for scanning the indicia of the item based on a position and/or direction of a handheld barcode reader held by a user, and whether the item was successfully scanned) to a user during the self-checkout process.

In an embodiment, a scanner is provided that includes a housing with a lower portion, an upper portion, and an extension arm extending upward from the lower portion to the upper portion. That extension arm may have varying shapes, including a shape that at least partially defines a region for scanning items between the lower portion and the upper portion. The lower portion may have an exit window and a lower imaging assembly mounted in the lower portion below that exit window. The lower imaging assembly may be characterized by having one or more fields of view directed upwardly through the exit window. Correspondingly, the upper portion may have an upper imaging assembly that has two fields of view that extend downwardly toward the lower portion with each having a central axis offset from (and in some examples obliquely angled) with respect to a center normal extending upward from the exit window. The central axis offset may be equal and opposite in distance. In examples where the central axis is obliquely angled those angles may be equal and opposite. In some examples, the lower imaging assembly has two fields of view that extend upwardly toward the upper portion with each having a central axis obliquely angled with respect to a normal extending upwardly from the exit window and with each extending upwardly along different oblique angles. The upper portion may be a unitary structure, for example, one formed of a single-mold frame structure.

In an embodiment, a scanner may be integrated in a POS, for example, in a retail environment. For example, a POS may include a first data capture region (e.g., a lead-in region including, but not limited to, a shopping cart area, a basket area, a flatbed cart area, and a countertop area) for positioning objects prior to scanning and a second data capture region (e.g., a lead-out region such as a bagging area) for storing objects after scanning. A scanner (e.g., a single plane scanner, a multiple plane scanner, a gateway scanner, or any suitable scanner) is positioned between the first and second data capture regions for scanning objects received from the first data capture region. The extension arm may include a window and forward-looking imaging assembly sized appropriately to further define a scanning region. In other examples, the extension arm may include a feature, label, light, or other indicator that identifies the location of the scanning region for a user.

Figure 1B:
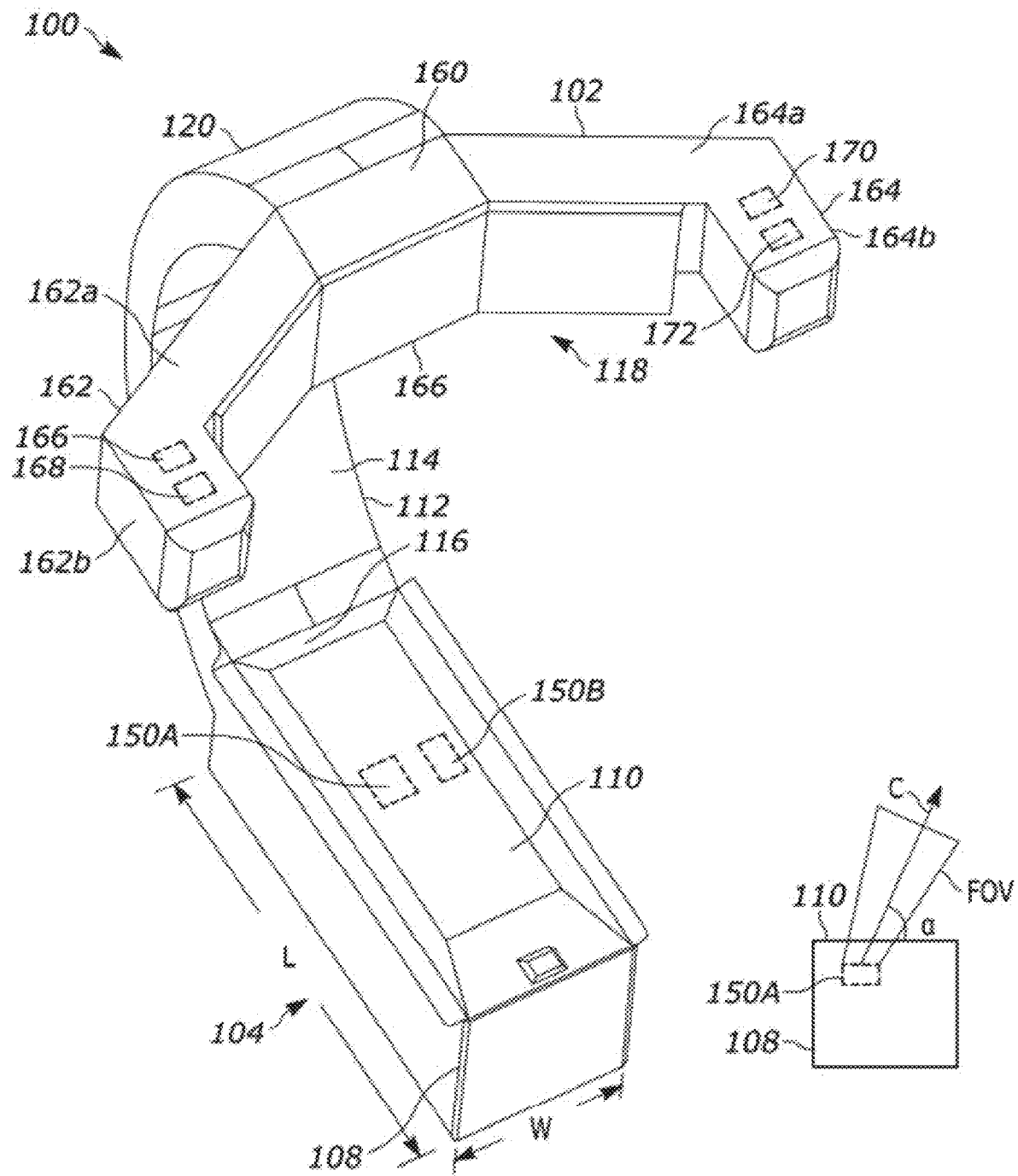

Referring to the Drawings, FIGS. 1A and 1B illustrate perspective views of a gateway scanner 100 with two branching arms. As shown in FIGS. 1A and 1B, the scanner 100 has a narrow-profile integrated design and includes a housing 102 having a lower portion 104 that defines a bottom extent of an item scanning region 106 (as shown in FIGS. 3A-3D). The lower portion 104, in the illustrated example, has a bottom frame 108 in which an opening is formed for placement of a transparent exit window 110, formed of a scratch resistance glass, for example. An upper surface of the exit window 110 provides a scan surface. A user can scan an item by moving it from one side of the item scanning region 106 above the window to the other side of the item scanning region 106. In the illustrated example, the item scanning region 106 may be a narrow scanning region. For example, the item scanning region 106 may be limited in width to the width, W, of the bottom frame 108. In some examples, the item scanning region 106 may be larger than this width, W, or smaller than this width, W. This lateral width, W, may be between 7 inches and 12 inches in some examples, and preferably no more than 10 inches. To maintain the narrow-profile, in some examples, a ratio of a vertical height, H, of the scanner 100 to a lateral width of the scanner 100 is at least 2:1. In some examples, the vertical height, H, is between 15 inches and 30 inches, for example. The exit window 110 can further provide a placement surface upon which items to be scanned may be placed, for example, when the bottom frame 108 includes an integrated weigh platter.

As shown in FIGS. 1A and 1B, an extension arm 112 extends upward from the bottom frame 108 and is characterized, at least in the illustrated example, by having an arcuate side profile that can be sized to allow the item scanning region 106 to extend the full length of the exit window 110, the full length, L, of the bottom frame 108, or to extend a greater length than the full length, L. For example, the extension arm 112 may have an arcuate inner wall surface 114 that extends from a distal end 116 of the bottom frame 108 at the lower portion 104 of the scanner 100 to an upper portion 118 of the scanner 100 where a mounting structure is provided for downwardly directing one or more imagers. The arcuate wall surface 114 may have a radius selected based on the size of the item scanning region desired, the amount of clearance desired for moving an item across an item scanning region (for example, for scanning items that are larger than an item scanning region), or a radius determined from other factors, such as the desired height of the upper portion 118. In some examples, the extension arm 112 has as arcuate outer wall surface 120 in addition to the arcuate inner wall surface 114. However, in other examples, the outer wall surface 120 may have a flat or other profile. Similarly, the inner wall surface 114 may have a flat or other profile in other examples.

In the illustrated example, the bottom frame 108 houses one or more upwardly directed imagers 150A and 150B (where two are shown) that each have a field of view (FOV) extending upwardly through the exit window 110. For example, the one or more imagers 150A and 150B may have fields of view (FsOV) that extend vertically or substantially vertically through the exit window 110 to coincide with the item scanning region 106. As used herein substantially vertically includes any FOV having a central axis, C, that forms an angle, a, with the horizontal plane of the exit window 110 that is at least 10°, from a side view, where 90° refers to absolute vertical. In other examples, the angle is from 10° up to but excluding 90°, or more preferably from 20° up to but excluding 90, or more preferably still from 30° up to but excluding 90°. Example resulting FsOV are shown in FIGS. 3A-3D, discussed further below.

In the illustrated example, the scanner 100 includes at the upper portion 118, a branching mount 160 integrated with the extension arm 112 and having two branching arms 162 and 164, each extending in opposing lateral directions away from a center region where the upper portion 118 is supported by the extension arm 112. In the illustrated example, the mount 160 includes an upper support frame 160 that rigidly supports each of the branching arms 162 and 164 to the extension arm 112. The branching arms 162 and 164 are multi-segment arms in the illustrated example, although any suitable configuration may be achieved. The branching arm 162 includes a first segment 162a that is deflecting in a horizontal direction but with an inward pitch formed by a pitch angle, where the first segment 162a terminates at a second segment 162b that provides a mount for one or more downwardly directed imagers. In this way, the branching arm 162 mounts its one or more downwardly directed imagers directed at a second data capture region (e.g., a lead-out region such as a bagging area) adjacent to a side of the scanner 100, for example, extending over at least a portion of a bagging area. Similarly, the branching arm 164 includes segments 164a and 164b having the same orientation but where the one or more downwardly directed imagers are directed at a first data capture region (e.g., a lead-in region including, but not limited to, a shopping cart area, a basket area, a flatbed cart area, and a countertop area) adjacent to a side of the scanner 100, for example, extending over at least a portion of a shopping cart area.

In the illustrated example, each of the segments 162b and 164b mount one or more imagers. In the illustrated example, the imaging assembly of the scanner 100 includes two imagers 166 and 168 mounted in segment 162b and two imagers 170 and 172 mounted in segment 164b. Alternatively, in other examples, the imaging assembly of the scanner 100 includes only one imager 166 mounted in the segment 162b and one imager 170 mounted in the segment 164b. Each of these imagers, (e.g., imagers 166, 168, 170 and/or 172), are mounted in the upper portion such that their respective FsOV extend downwardly toward the lower portion 104 with each respective FOV having a central axis that is offset with respect to a center normal of the exit window 110 in the lower portion 104. In some examples, the upper portion 118 is configured such that the imagers 166 and 168 and 170 and 172 are directed downwardly and biased in the direction of a user positioned for scanning items using the scanner 100. In some examples, the upper portion 118 is configured such that an upper imaging assembly has one or more imagers mounted in each branching arm 162 and 164 such that their respective FsOV are offset from the center normal of the exit window by an equal and opposite offset distance. In some examples, the offset distance is greater than half a lateral width of the lower portion 104. In some examples, the upper portion 118 is configured such that the FsOV extend downwardly toward the lower portion 104, which each FOV central axis obliquely angled with respect to the center normal of the exit window, e.g., obliquely angled by equal and opposite angles.

Figure 2:
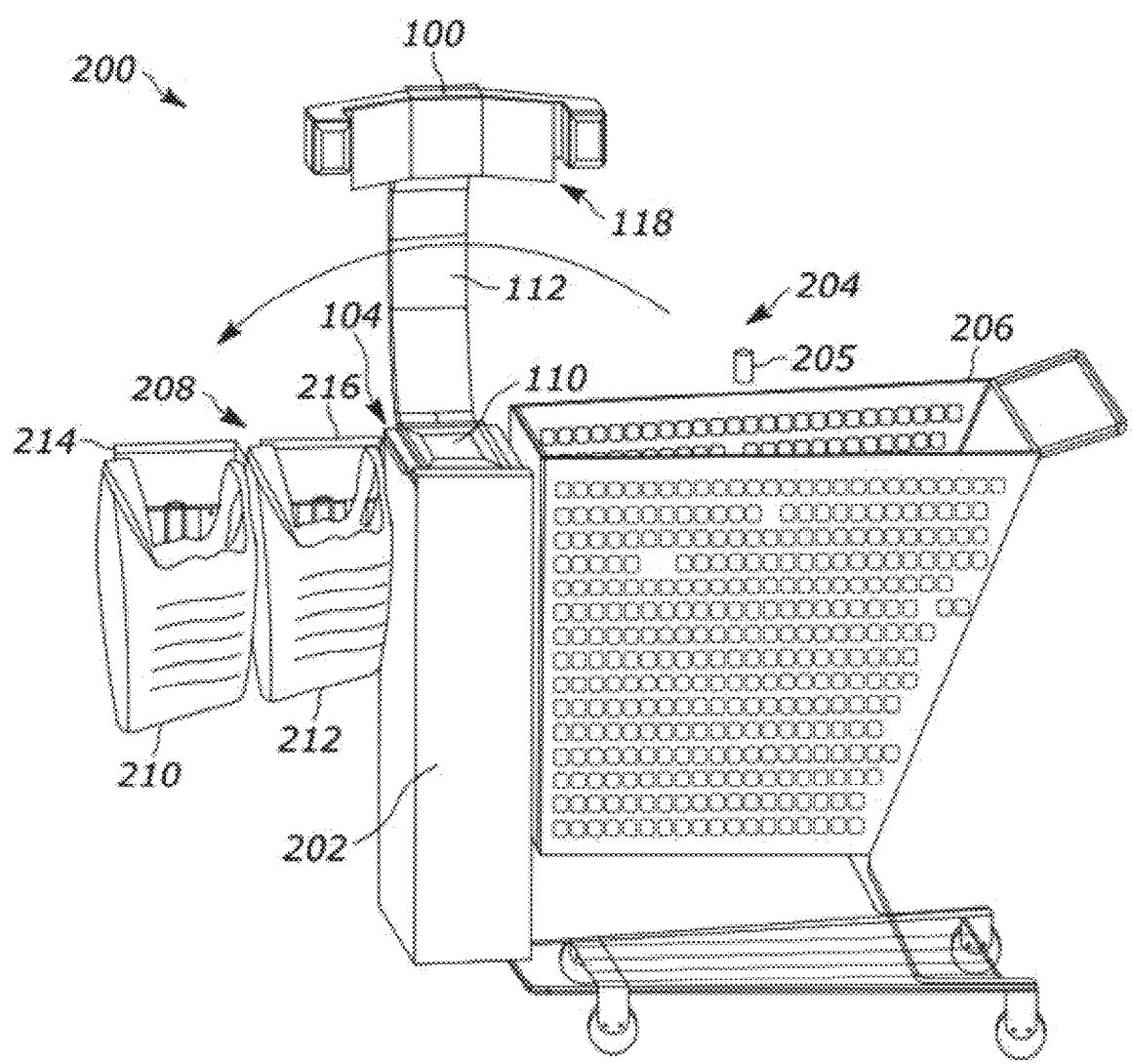
FIG. 2 illustrates a perspective view of the gateway scanner of FIGS. 1A and 1B in a self-checkout location of a retail environment.

FIG. 2 illustrates the scanner 100 positioned in self-checkout location 200 of a retail environment. The bottom frame 108 of the scanner 100 is mounted in a support structure 202 that extends from a floor and such the scanner 100 is positioned between (i) a first data capture region 204 (e.g., a lead-in region including, but not limited to, a shopping cart area, a basket area, a flatbed cart area, and a countertop area) and (ii) a second data capture region 208 (e.g., a lead-out region such as a bagging area). The first data capture region 204 is a shopping cart area including a shopping cart 206 and the second data capture region 208 is a bagging area including bags 210 and 210 respectively mounted to bagging frames 214 and 216. A general direction of movement of an item 205 from the first data capture region 204 to the second data capture region 208 is shown. The scanner 100 may be agnostic to the direction of movement from one data capture region to the other, allowing scanning of an item regardless of direction of movement across an item scanning region.

The narrow width of the scanner 200 combined with the positioning of the first and second data capture regions 204 and 208 allows for a natural movement between the two data capture regions 204 and 208, thereby encouraging a user to follow a natural path through the item scanning region. In an embodiment, a narrow scanner can be sized such that an area to position an item 205 proximate to or on the scanner is non-existent. This encourages a user to pick up an item 205 from a shopping cart 206, immediately scan the item 205, and place the item 205 in a bag 210 or 212 without necessitating a step in the middle of scanning such as putting an item 205 down. Removing this step can prevent an accidental scan of an item 205 positioned proximate to or on a scanner and can help ensure that an item 205 is in an appropriate position to be monitored by a vision system and/or personnel (e.g., an associate).

FIGS. 3A-3D illustrate example FsOV of various imagers of the scanner 100. Imagers 170 and 172 have corresponding fields of view 220 and 222 that are downwardly directed. The FsOV 220 and 222 may have central axes, C, having an origin point that is laterally offset by a distance, λ, from a center normal axis, D, of the exit window 110. In some examples, the FsOV 220 and 222 are downwardly directed toward the center normal axis, D, at an oblique angle, β, with respect to the center normal axis to overlap with the scan region 106. Correspondingly, the imagers 166 and 168 have corresponding FsOV 224 and 226 that may have central axes that are laterally offset from the center normal axis, D, of the exit window 110. In some examples, the FsOV 224 and 226 are downwardly directed toward the center normal axis, D, at an oblique angle.

The downwardly directed FsOV of a scanner 100 may result from several different combinations of imagers and FsOV thereof so long as adequate image resolution and coverage is provided to fully cover the lower portion of the housing and to decode indicia at any upward-facing orientation before the indicia is identified by any upward-looking FsOV emanating from the lower portion. Further, in various examples, combinations of different FsOV emanating from the scanner 100 may be used to overlap and define a scan region 106 while providing angular coverage adequate to ensure that an indicia is identifiable and scannable on any of the 6 sides of a rectangular-shaped item oriented in any direction (e.g., an indication of 360° coverage).

The FsOV 220 and 222 define a first edge plane of the scan region 106, and the FsOV 224 and 226 define a second edge plane of the scan region 106. The first and second edge planes can define first and second outer extents of the scan region 106. The branching arms 162 and 164 position respective imagers to generate angled first and second edge planes, as measured against a vertical plane. Angled edge planes may be desired to provide a more confined scan region 106. The exact angle may be determined by the shape of the branching arms 162 and 164 (e.g., by how far the branching arms 162 and 164 extend from the extension arm 112). The orientation of the respective FsOV of the imagers 166 and 168 of the branching arm 162 and of the imagers 170 and 172 of the branching arm 164 may be determined from internal optics of the imagers, apertures of the imagers, or other confinement techniques. The FsOV 220, 222, 224, and 226 allow for scanning an item from the left side, the right side, and from the top.

Figure 3A:
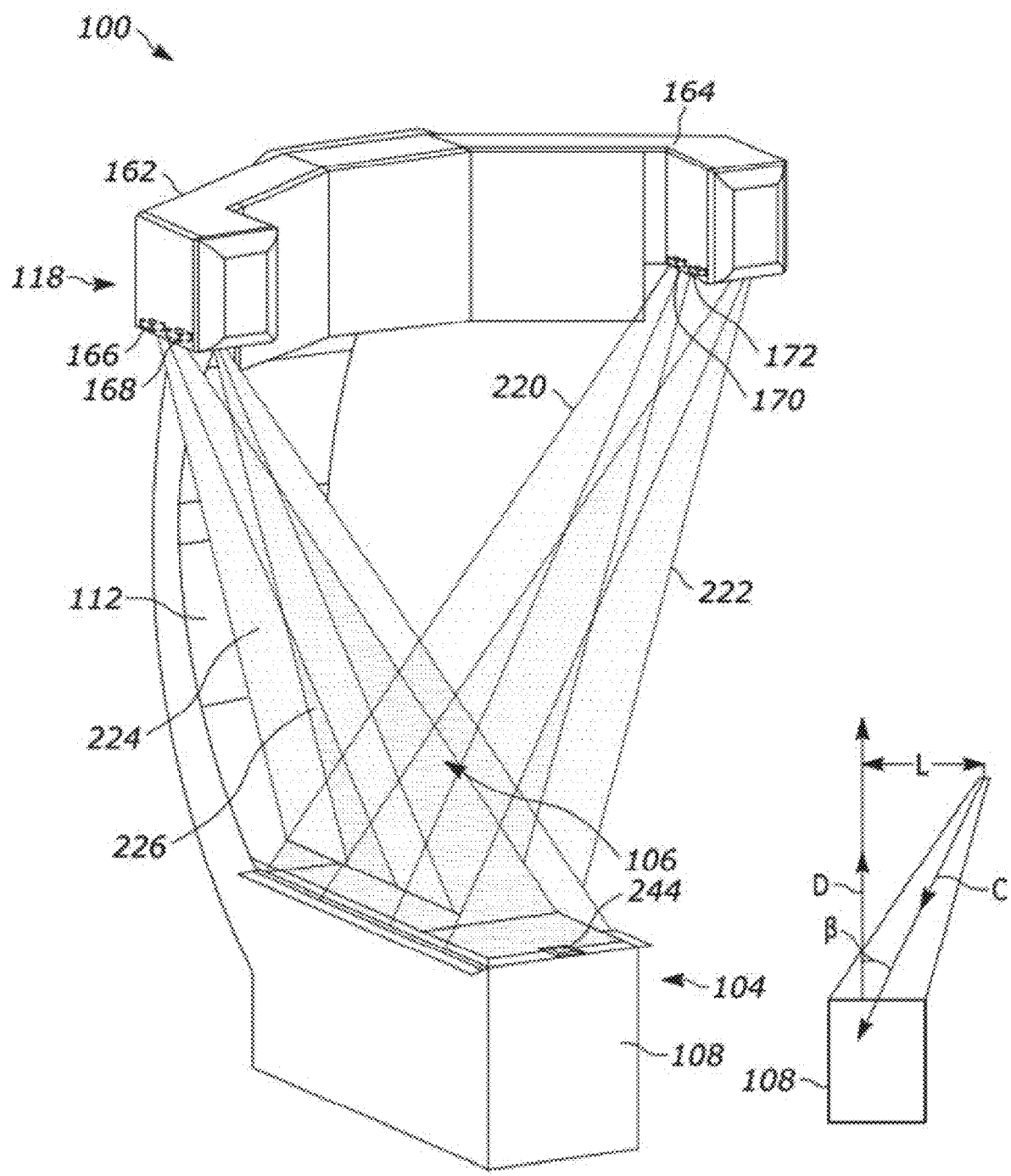
FIGS. 3A, 3B, 3C, and 3D are different perspective views of the gateway scanner of FIGS. 1A and 1B illustrating different imager fields of view.
Figure 3B:
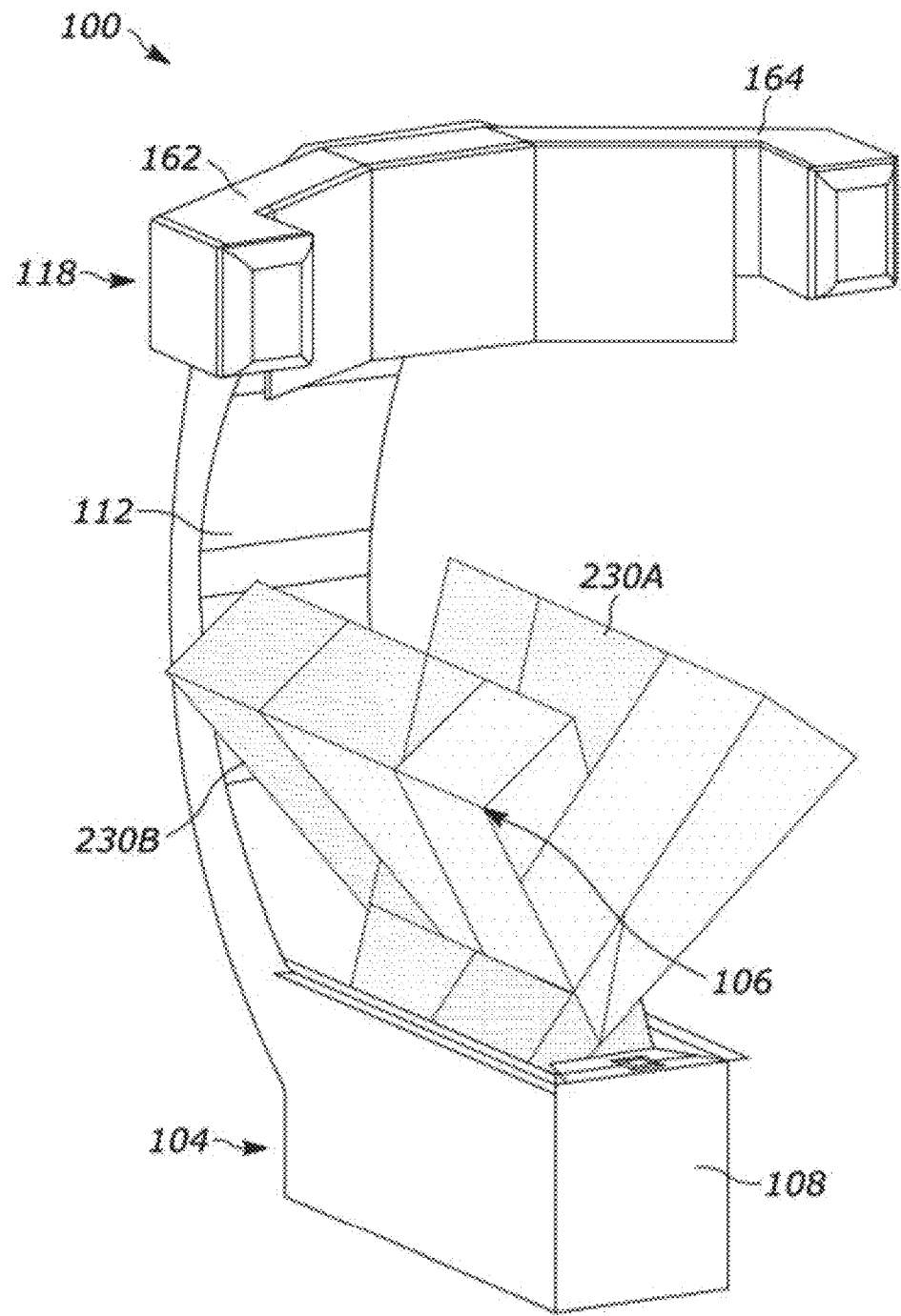

FIG. 3B illustrates FsOV 230A and 230B corresponding to upwardly directed imagers 150A and 150B (as shown in FIGS. 1A and 1B) positioned in the bottom frame 108. The imagers 150A and 150B are mounted such that their corresponding FsOV 230A and 230B are angled relative to a vertical plane, that is, a center axis of the FOV forms an acute angle with the vertical plane. The fields of view 230A and 230B allow for scanning an item from the left side, the right side, and from the bottom. As shown in FIG. 3D, the scan region 106 coincides with a scan volume defined by the fields of view 220, 222, 224, 226, 150A, and 150B.

Figure 3C:
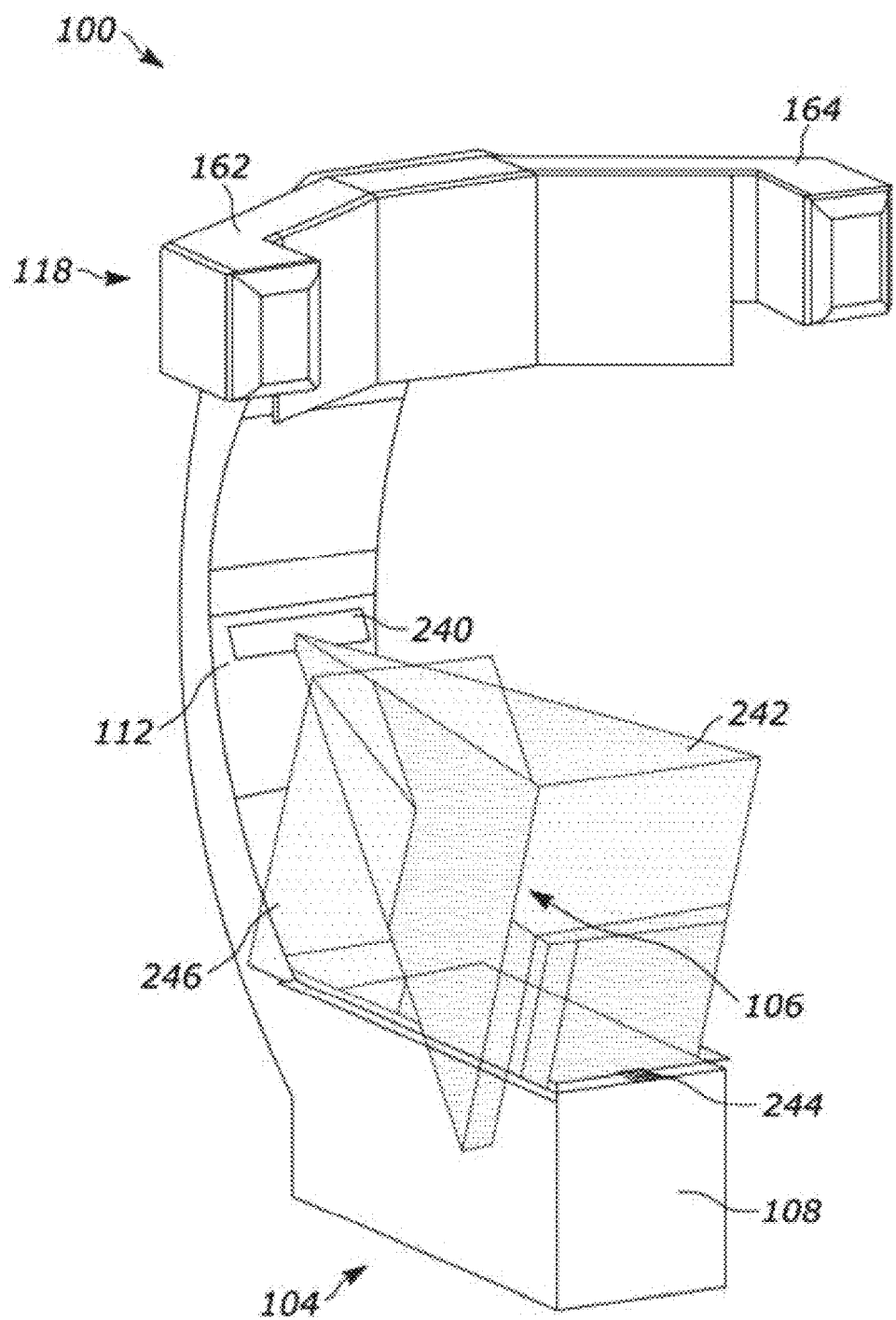
Figure 3D:
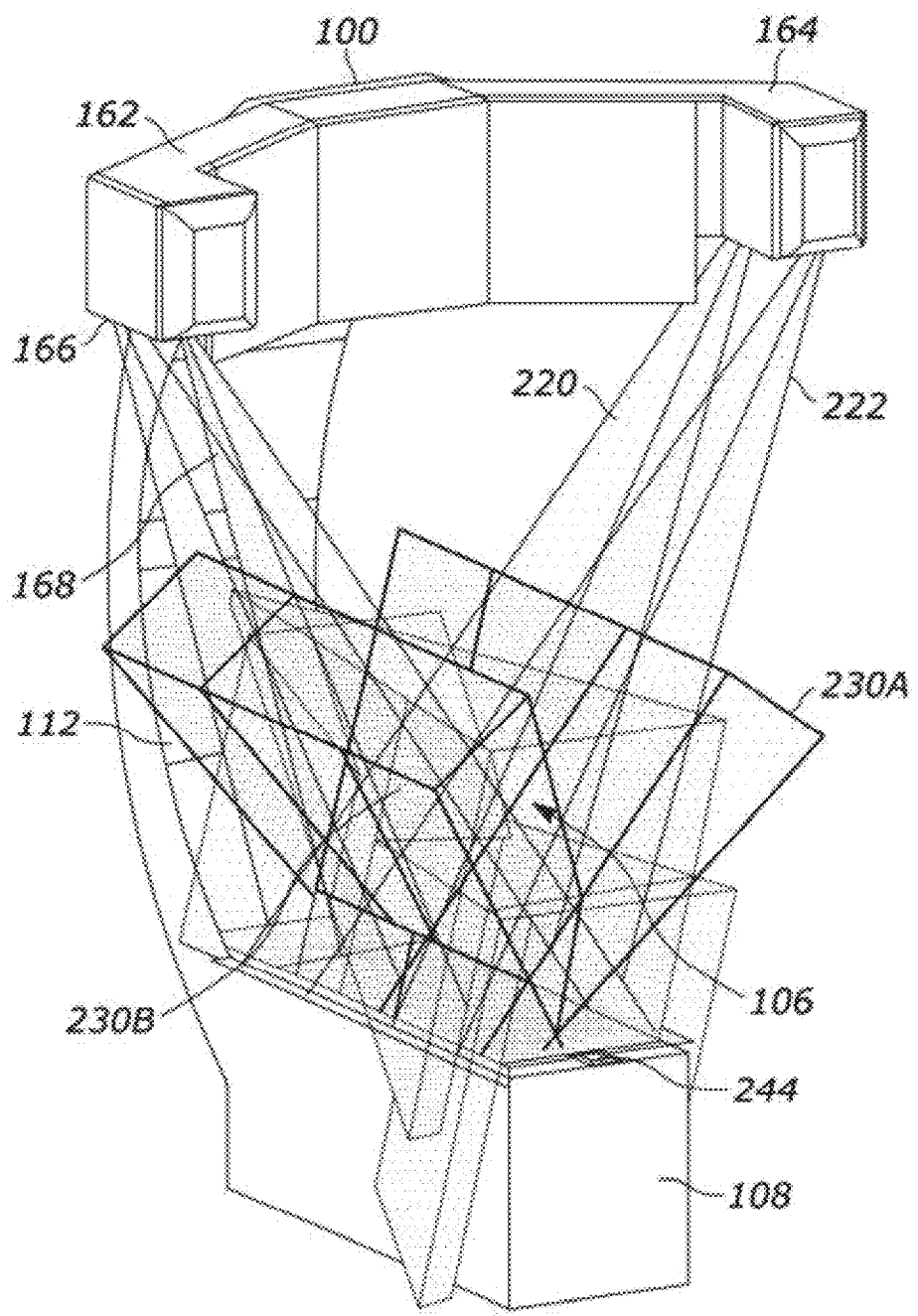

FIG. 3C illustrates FsOV 242 and 246 respectively corresponding to imagers 240 and 244. The imager 240 (e.g., a front directed imager) is positioned in the extension arm 112 and is characterized by a FOV 242 directed toward a user. The imager 240 may be positioned at any suitable location on the extension arm 112. In some examples, the front directed imager 240 may be positioned at the distal end of the bottom frame 108. The imager 244 (e.g., a back directed imager) is positioned at a proximal edge of the bottom frame 108 and is characterized by a FOV 246 directed toward the extension arm 112. In some examples, each FOV 242 and 246 is a narrow FOV having a width generally confined to a scan region. In other examples, the back directed FOV 246 is narrow, and the front directed FOV 242 is a wide-angle field of view, for example, allowing for coverage that extends beyond the width of the bottom portion 104.

FIG. 3D illustrates overlapping FsOV 220, 222, 224, 226, 230A, 230B, 242, and 246 of FIGS. 3A-3C to collectively define the scan region 106 (e.g., a scan volume). The scanner 100 provides for orientation independent scanning of indicia of an item via overlapping upwardly directed and downwardly directed FsOV where at least some of the downwardly directed FsOV are angled downward and inward.

Figure 4A:
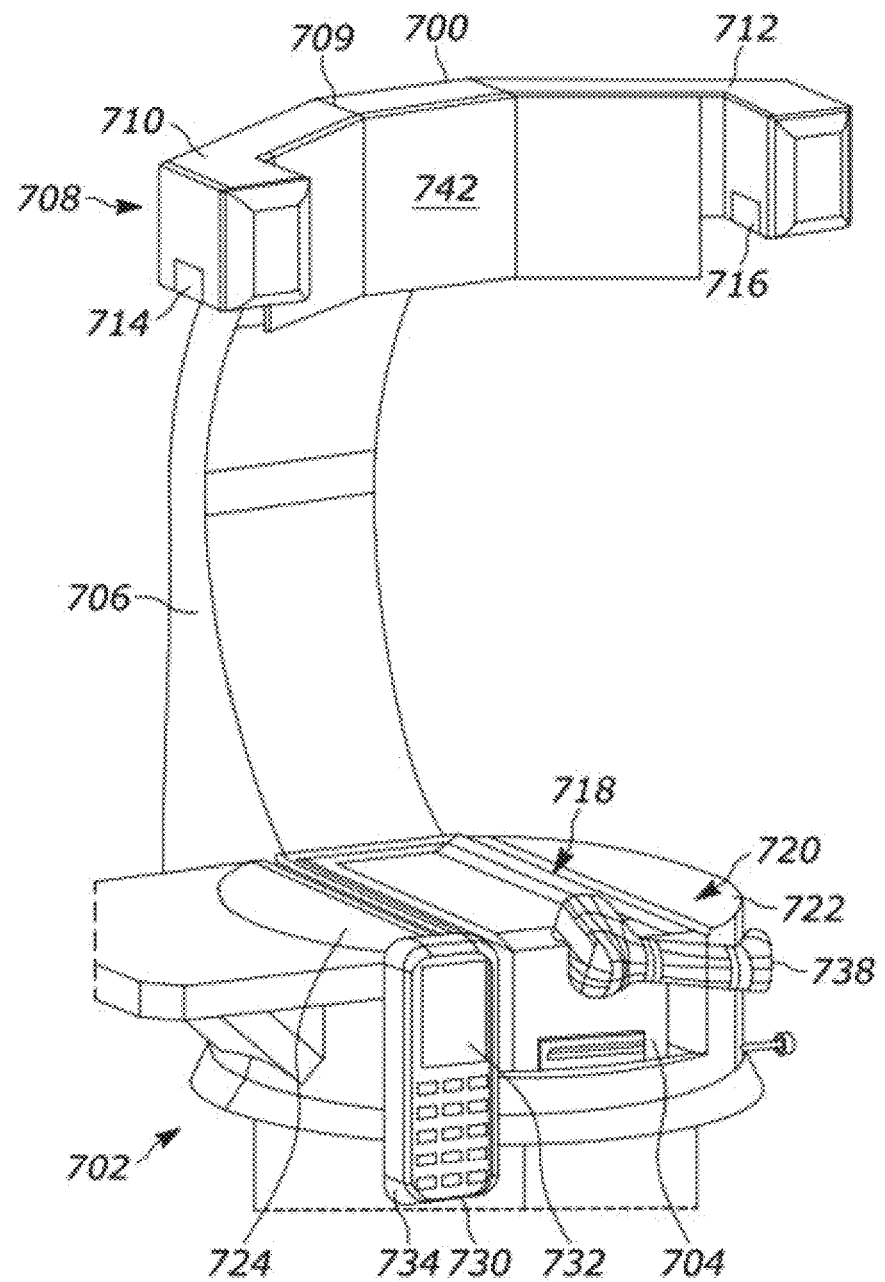
FIGS. 4A, and 4B are perspective views of another gateway scanner integrated with components.
Figure 4B:
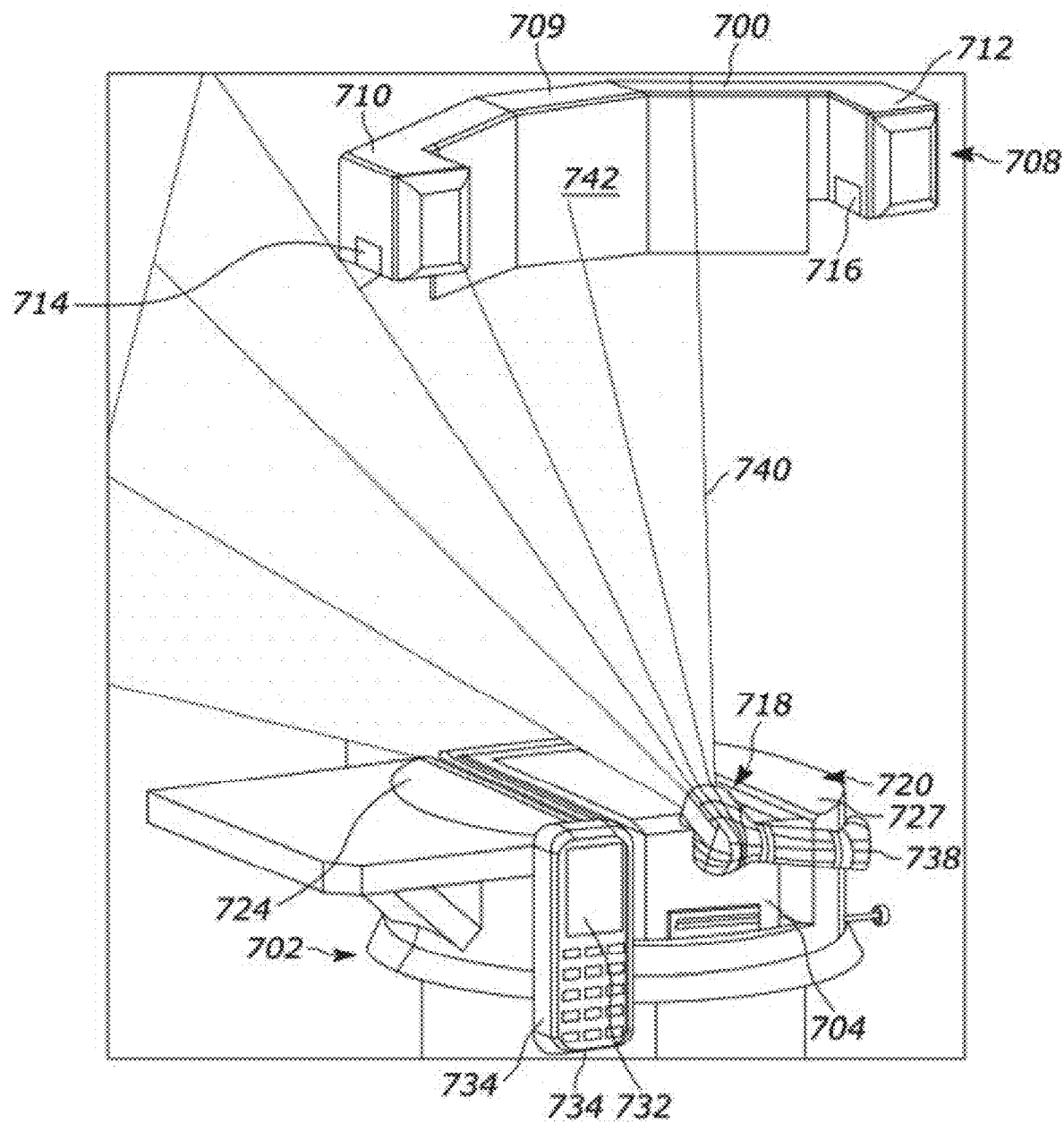

Various gateway scanner examples herein allow for integrating or mounting components (e.g., a computer terminal, a handheld indicia reader, and a display) that may reduce and/or streamline one or more self-checkout processing steps by automatically addressing exceptions during the self-checkout process. FIGS. 4A and 4B illustrate an example scanner 700. The scanner 700 includes a lower portion 702 having a bottom frame 704 containing one or more upwardly directed imagers and an optional weigh platter (neither shown). An extension arm 706 having an arcuate inner wall configuration extends from the lower portion 702 (e.g., from the bottom frame 704) to an upper portion 708 and connects to a branching mount 709 formed of two branching arms 710 and 712. Branching arm 710 has one or more downwardly directed imagers (e.g., imager 714) and branching arm 712 has one or more downwardly directed imagers (e.g., imager 716).

To facilitate integration of a user computer terminal 730 (e.g., a payment terminal), the bottom frame 704 is recessed in an opening 718 of a support base 720. The opening 718 extends between a platform portion 722 and a platform portion 724 of the base 720. A computer terminal 730 is mounted to the base 720 to display information related to item scanning on a display 732 and to allow user input through a keypad 734 or other input device. In the illustrated example, the computer terminal 730 is a user payment terminal that includes a credit card swipe slot (not shown) and which may further include a near field communication (NFC) reader embedded therein to allow for contactless payment.

As mentioned, in some examples, a gateway scanner may include one or more back directed imagers having a FOV that is directed toward an extension arm. The scanner 700 illustrates an example configuration, in which the back directed imager is contained within a handheld indicia reader 738 (e.g., a barcode reader) that is mounted to the base 720 such that the FOV 740 (as shown in FIG. 4B) of the handheld indicia reader 738 extends to overlap with a scan volume and which may be angled upward, (e.g., having a central axis that forms an acute angle with a horizontal plane coinciding with an upper surface 738 of the bottom frame 704). The vertical extent of the FOV 740 does not impinge on a digital display 742 of scanner 700. In this way, the FOV 740 does not generate infrared reflections off the display 742 in the case of an IR imager, any reflection of an aimer beam or aim pattern in the case of an imager with integrated aimer assembly, or any reflection of visible illumination in the case of an imager with integrated illumination assembly.

In an embodiment, a scanner can include a back directed imager (e.g., the imager 244 of FIG. 3C) in addition to the handheld indicia reader 738 as an external component as discussed below in relation to FIGS. 5 and 6. In this way, the scanner can address exceptions (e.g., an item that is too heavy and/or bulky to place on a conveyor belt or present to the scanner or an item that is not visible in a scan field or by the field of view of an imager) during the self-checkout process via the handheld indicia reader 738.

Figure 5:
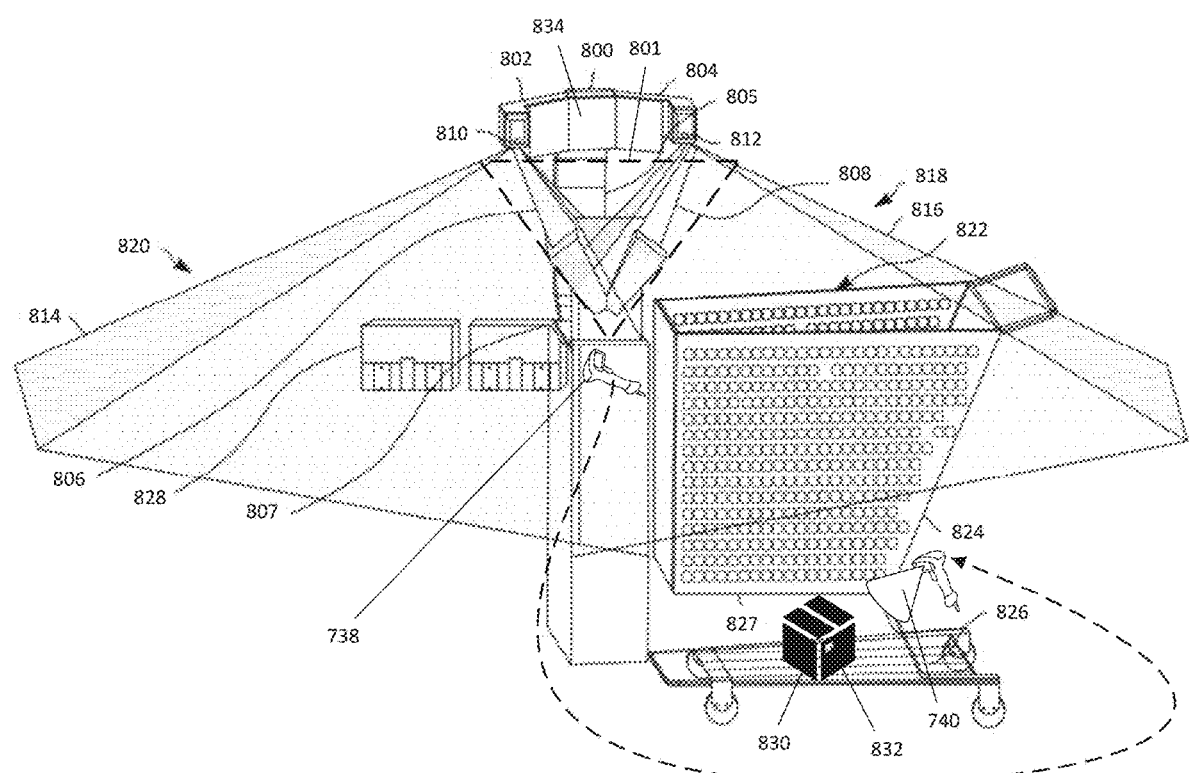
FIG. 5 is a perspective view of the gateway scanner having wide-angle field of view imagers in a self-checkout location of a retail environment.

FIG. 5 is a perspective view of a gateway scanner in a self-checkout location of a retail environment. The gateway scanner 800 provides item orientation independent scanning capabilities and imaging to monitor a first data capture region 818 (e.g., a shopping cart area) and/or a second data capture region 820 (e.g., a bagging area).

The scanner 800 has a gateway design similar to scanner 100 of FIGS. 1-3D. The scanner 800 includes branching arms 802 and 804. The branching arms 802 and 804 each include a data capture assembly having one or more downwardly directed imagers (not shown) for scanning an item and identifying indicia in image data capture over respective narrow FsOV 806 and 808. The FsOV 806 and 808 can correspond to one of a downwardly directed looking vision camera assembly, an infrared (IR) sensor assembly, or a lidar sensor assembly comprising at least one imager configured to scan an indicia associated with an item within an item scanning region 801.

The branching arms 802 and 804 are connected to an extension arm 805 connected to a bottom portion 807. The branching arms 802 and 804 also each include a data capture assembly having respective wide-angle imagers 810 and 812. The wide-angle imager 810 has a wide-angle FOV 814 and the wide-angle imager 812 has a wide-angle FOV 816. The wide-angle imagers 810 and 812 may be vision cameras, such as 2D color vision cameras, or 3D cameras, such as time of flight cameras.

The wide-angle imager 812 captures image data over the FOV 816 that expands to cover a first data capture region 818 (e.g., a lead-in region including, but not limited to, a shopping cart area, a basket area, a flatbed cart area, a countertop area, and an area in front of the imager 812). The FOV 816 can correspond to a downwardly directed looking vision camera assembly configured to detect an item within the first data capture region 818 (e.g., a shopping cart area). As shown in FIG. 5, the FOV 816 expands to cover the first data capture region 818 and extends at least partially outside the FOV 808 associated with the item scanning region 801.

The wide-angle imager 810 captures image data over the FOV 814 that expands to cover a second data capture region 820 (e.g., a lead-out region including, but not limited to, a bagging area and an area in front of the imager 810). The FOV 814 can correspond to a downwardly directed looking vision camera assembly configured to detect an item within the second data capture region 820 (e.g., a bagging area). As shown in FIG. 5, the FOV 814 expands to cover the second data capture region 820 and extends at least partially outside the FOV 806 associated with the item scanning region 801.

In an embodiment, the FOV 808 and the FOV 816 can originate from a data capture assembly (e.g., a camera assembly such as a vision or 3D camera assembly, an IR sensor assembly, or a lidar sensor assembly) having a single downwardly directed imager configured to scan an indicia associated with an item within an item scanning region 801 and detect an item within the first data capture region 818 (e.g., a shopping cart area). For example, a single, downward-looking FOV may be split (e.g., via at least one mirror and/or prism) into two segments to create the FsOV 808 and 816.

Additionally, in an embodiment, the FOV 806 and the FOV 814 can originate from a data capture assembly (e.g., a camera assembly such as a vision or 3D camera assembly, an IR sensor assembly, or a lidar sensor assembly) having a single downwardly directed imager configured to scan an indicia associated with an item within an item scanning region 801 and detect an item within the second data capture region 820 (e.g., a bagging area). For example, a single, downward-looking FOV may be split (e.g., via at least one mirror and/or prism) into two segments to create the FsOV 806 and 814.

The FOV 816 allows the imager 812 to capture image data over a partial or an entire opening 822 of a shopping cart 824 positioned in the first data capture region 818 (e.g., a shopping cart area) and/or over a partial or an entire bottom surface 827 of the shopping cart 824, and/or over a partial or an entire top surface of an under tray 826 of the shopping cart 824. In this way, the scanner 800 can capture image data of an item exiting the opening 822, an item within the cart portion of the shopping cart 824, and/or an item positioned on the under tray 826 of the shopping cart 824. In an embodiment, the FOV 816 can include at least one of a partial or an entire opening of a basket positioned in the basket area, a partial or an entire top surface of a flatbed cart positioned in the flatbed cart area, or a partial or an entire top surface of a countertop positioned in the countertop area.

The FOV 814 allows the imager 810 to capture image data of the second data capture region 820 (e.g., a bagging area) including a partial or an entire opening of a bag 828 positioned in the second data capture region 820. For example, the FOV 814 can capture image data of an item entering the second data capture region 820 including, but not limited to, an item entering the bag 828 such that an opening of the bag 828 and a bottom of the bag 828 may be imaged by capturing image data over the FOV 814.

As shown in FIG. 5, an item 830 having an indicia 832 (e.g., a barcode) is positioned on the top surface of the under tray 826. Often, a user (e.g., a customer) may not remove an item 830 from the under tray 826 to scan the item 830 in the item scanning region 801 due to one or more attributes of the item 830 and/or one or more attributes of the user. For example, the item 830 may be too heavy, large, and/or bulky to comfortably remove the item 830 from the under tray 826 and scan the item 830 in the item scanning region 801. In another example, a user may have a medical condition (e.g., a bulging or herniated disk, a knee or hip replacement, weak grip, etc.) that may prevent the user from comfortably removing the item 830 from the under tray 826 and scanning the item 830 in the item scanning region 801. In another example, a user may prefer to scan the item 830 with a handheld indicia reader 738 (e.g., a mobile scanner including, but not limited to, a barcode reader) instead of removing the item from the under tray 826. It should be understood that the item 830 may be positioned within the shopping cart 824 (e.g., on a bottom surface 827) and that a user may not remove an item 830 from the bottom surface 827 to scan the item 830 in the item scanning region 801 due to one or more attributes of the item 830 and/or one or more attributes of the user as described above. As such, a user may utilize a handheld indicia reader 738 to scan an item 830 positioned on the top surface of the under tray 826 of the shopping cart 824 or on a bottom surface 827 of the shopping cart 824. As described in further detail below, the scanner 800 can confirm whether a user utilizes a handheld indicia reader 738 to scan an item 830 positioned on the top surface of the under tray 826 of the shopping cart 824 or on a bottom surface 827 of the shopping cart 824.

The scanner 800 can detect, via the FOV 816, that the item 830 is within the first data capture region 818 (e.g., a shopping cart area) and outside of the item scanning region 801. Responsive to detecting the item 830, the scanner 800 can determine whether the item 830 remains outside of the item scanning region 801 during a first time period. The first time period is associated with a scanning session within the item scanning region 801 and/or a transaction session (e.g., a check out session). Responsive to determining that the item 830 remains outside of the item scanning region 801 during the first time period (e.g., the item 830 has not been scanned within the item scanning region 801 during the first time period), the scanner 800 can determine whether a handheld indicia reader 738 (e.g., a mobile scanner including, but not limited to, a barcode reader) is utilized. For example, the scanner 800 can determine whether a user (e.g., a customer) has disengaged the handheld indicia reader 738 from the scanner 800, moved the handheld indicia reader 738 within the FOV 816, and/or scanned the indicia 832 of the item 830. Responsive to determining that the handheld indicia reader 738 is not utilized, the scanner 800 can trigger an alert associated with non-scanning of the item 830. For example, the alert is indicative that the item 830 was not scanned within the item scanning region 801 and was not scanned by the handheld indicia reader 738. In an embodiment, the alert can be displayed on a display 834 of the scanner 800 and/or a display of a mobile device of personnel (e.g., an associate or employee) associated with the scanner 800.

In an embodiment, responsive to determining the handheld indicia reader 738 is utilized, the scanner 800 can detect a position of the handheld indicia reader 738 within the first data capture region 818 (e.g., a shopping cart area). The position of the handheld indicia reader 738 can include, but is not limited to, an orientation (e.g., a pitch, roll, and yaw) of the handheld indicia reader 738 and a direction of a FOV 740 of the handheld indicia reader 738. The scanner 800 can determine whether the detected position of the handheld indicia reader 738 within the first data capture region 818 corresponds to a position of the detected item 830 within the first data capture region 818 during a scanning session of the handheld indicia reader 738. For example, the scanner 800 can determine whether the handheld indicia reader 738 is oriented towards a position of the detected item 830 such that a direction of the FOV 740 of the handheld indicia reader 738 expands to cover the indicia 832 of the item 830. Additionally, the scanner 800 can utilize an item identification system to identify the item 830, determine a location of the indicia 832 on the item 830 based on the identification of the item 830, and confirm, based on the determination, that the handheld indicia reader 738 is oriented towards a position of the detected item 830 such that a direction of the FOV 740 of the handheld indicia reader 738 expands to cover the indicia 832. Responsive to determining the detected position of the handheld indicia reader 738 within the first data capture region 818 corresponds to the position of the detected item 830 within the first data capture region 818 during the scanning session of the handheld indicia reader 738, the scanner 800 can effect a transaction of the item 830.

In this way, the scanner 800 can determine whether a user scanned the item 830 (e.g., the indicia 832 of the item 830 was decoded) or attempted to deceptively (e.g., pretend) scan the item 830 (e.g., the indicia 832 of the item 830 was not decoded). The scanner 800 can synchronize image data of the detected position of the handheld indicia reader 738 within the first data capture region 818 with decode data of the scanning session of the handheld indicia reader 738 to determine whether a user scanned the item 830 or attempted to deceptively scan the item 830. For example, if the synchronized image data and decode data indicate that the handheld indicia reader 738 was positioned proximate to the under tray 826 and/or a direction of a FOV 740 of the handheld indicia reader 738 expanded to cover the indicia 832 of the item 830 during the scanning session of the handheld indicia reader 738, then the scanner 800 can determine the item 830 was scanned (e.g., the indicia 832 of the item 830 was decoded) and can effect a transaction of the item 830.

In another embodiment, responsive to determining the handheld indicia reader 738 is utilized, the scanner 800 can detect a position of the handheld indicia reader 738 within the first data capture region 818 (e.g., a shopping cart area). The position of the handheld indicia reader 738 can include, but is not limited to, an orientation (e.g., a pitch, roll, and yaw) of the handheld indicia reader 738 and a direction of a FOV 740 of the handheld indicia reader 738. The scanner 800 can determine whether the detected position of the handheld indicia reader 738 within the first data capture region 818 corresponds to a position of the detected item 830 within the first data capture region 818 during a scanning session of the handheld indicia reader 738. For example, the scanner 800 can determine whether the handheld indicia reader 738 is oriented towards a position of the detected item 830 such that a direction of the FOV 740 of the handheld indicia reader 738 expands to cover the indicia 832 of the item 830. Additionally, the scanner 800 can utilize an item identification system to identify the item 830, determine a location of the indicia 832 on the item 830 based on the identification of the item 830, and confirm, based on the determination, that the handheld indicia reader 738 is oriented towards a position of the detected item 830 such that a direction of the FOV 740 of the handheld indicia reader 738 expands to cover the indicia 832. The scanner 800 can determine whether the detected position of the handheld indicia reader 738 within the first data capture region 818 corresponds to a position of the detected item 830 within the first data capture region 818 during a scanning session of the handheld indicia reader 738. Responsive to determining the detected position of the handheld indicia reader 738 within the first data capture region 818 does not correspond to the position of the detected item 830 within the first data capture region 818 during the scanning session of the handheld indicia reader 738, the scanner 800 can trigger an alert associated with non-scanning of the item 830. For example, the alert is indicative that the item 830 was not scanned within the item scanning region 801 and was not scanned by the handheld indicia reader 738. In an embodiment, the alert can be displayed on a display 834 of the scanner 800 and/or a display of a mobile device of personnel (e.g., an associate or employee) associated with the scanner 800.

In this way, the scanner 800 can determine whether a user scanned the item 830 (e.g., the indicia 832 of the item 830 was decoded) or attempted to deceptively (e.g., pretend) scan the item 830 (e.g., the indicia 832 of the item 830 was not decoded). The scanner 800 can synchronize image data of the detected position of the handheld indicia reader 738 within the first data capture region 818 with decode data of the scanning session of the handheld indicia reader 738 to determine whether a user scanned the item 830 or attempted to deceptively scan the item 830. For example, if the synchronized image data and decode data indicate that the handheld indicia reader 738 was positioned above the shopping cart 824 and/or a direction of a FOV 740 of the handheld indicia reader 738 did not expand to cover the indicia 832 of the item 830 during the scanning session of the handheld indicia reader 738, then the scanner 800 can determine the item 830 was not scanned (e.g., the indicia 832 of the item 830 was not decoded) and can trigger an alert.

In the illustrated example, the branching arms 802 and 804 each include two types of imagers, narrow FOV imagers (not shown) generating FOVs 806 and 808, respectively, and wide-angle FOV imagers 810 and 812 generating the FOVs 814 and 816, respectively. In other examples, the branching arms 802 and 804 may each have a single wide-angle imager that generates the FsOV 814 and 816 respectively. In some examples, imaging of the item scanning region 801 is performed by processing a portion of the image capture data that corresponds to the portions of the FsOV 814 and 816 overlapping the item scanning region 801. For example, in such configurations, the FOV 806 may be a portion of the FOV 814 for a single imager, and similarly, the FOV 808 may be a portion of the FOV 816 for a single imager. In yet other examples, the branching arms 802 and 804 may be adjustable to accommodate different sized first and second data capture regions 818 and 820. The adjustability may provide lateral adjustment (across the view of FIG. 5), transverse adjustment (into or out of the view of FIG. 5), or angular adjustments. The adjustments may be to/from fixed predefined positions or angles.

As mentioned above, in various embodiments, a system is provided having a scanner with a scan surface and multiple imagers with overlapping fields of view over the scan surface and adjacent to the scan surface, including one or more upwardly directed imagers and one or more downwardly directed imagers. A scanner may include, but it not limited to, a single plane scanner, a multiplane scanner, a gateway scanner or any suitable scanner. Additionally, the scanner may be a standalone scanner, or a scanner integrated into a point of sale (POS) station. For example, the scanner may be positioned on a top surface of a countertop of a POS station or within the countertop of the POS station.

Figure 6:
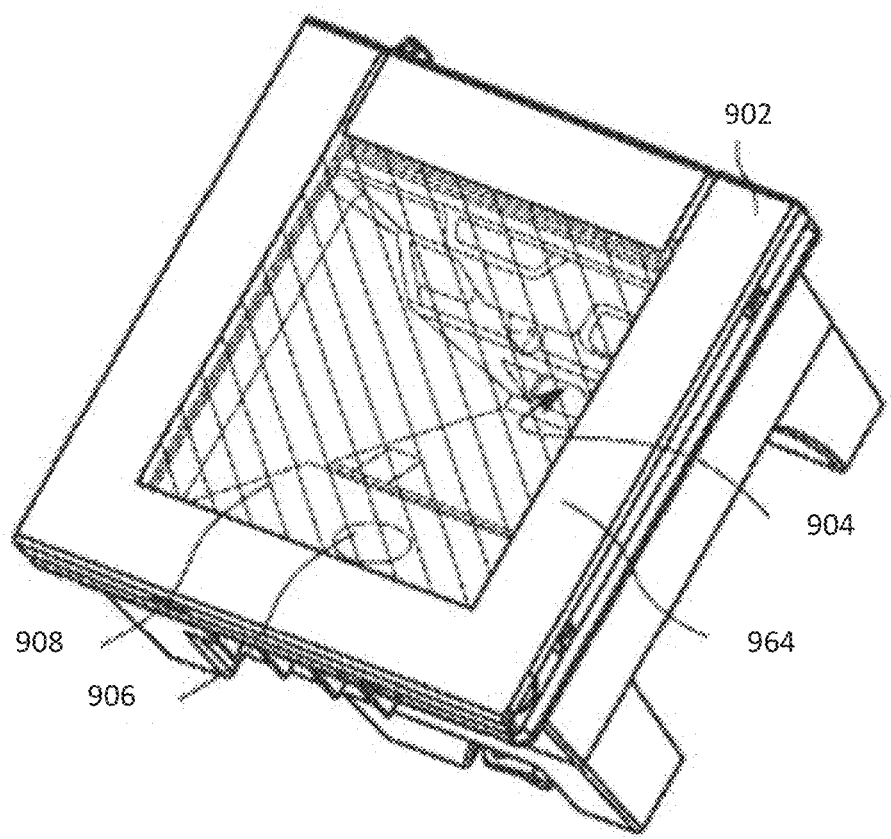
FIG. 6 illustrates a perspective view of a single plane scanner.
Figure 7:
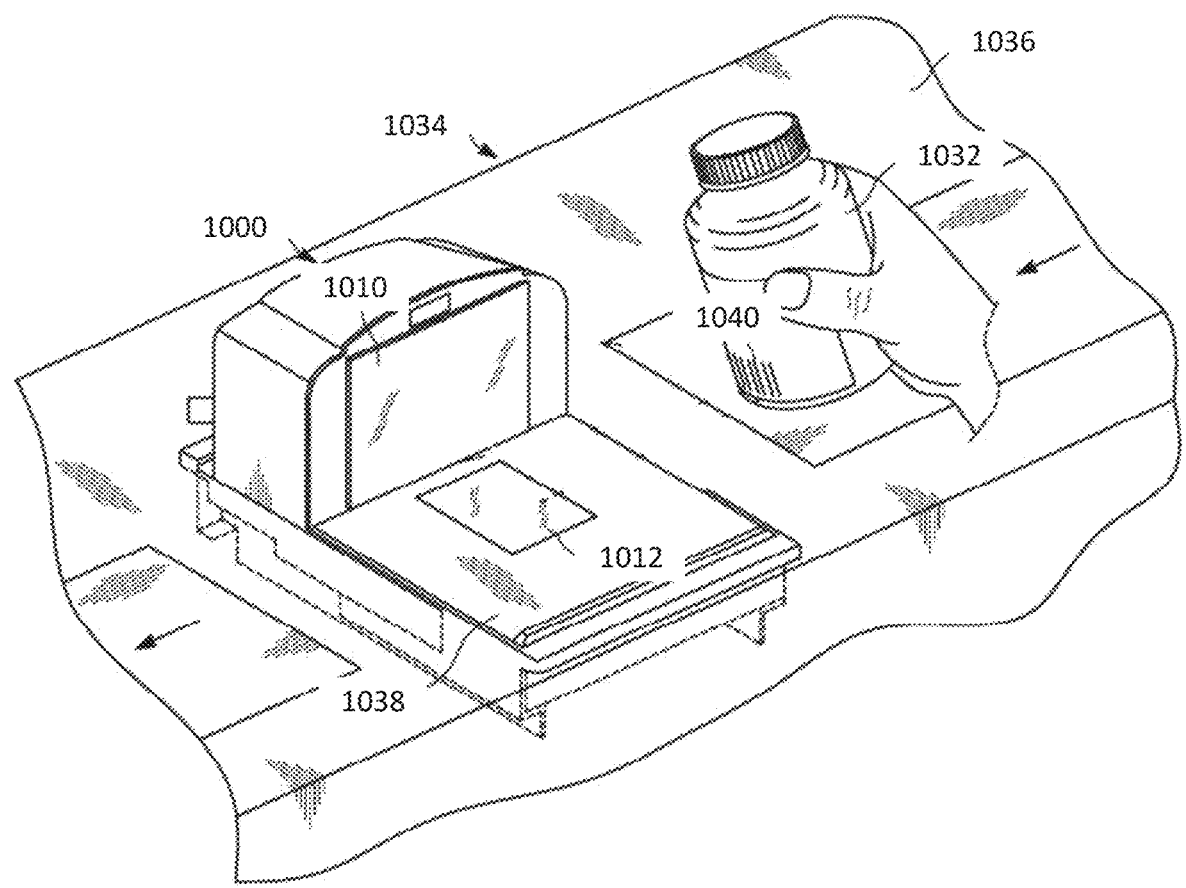
FIG. 7 illustrates a perspective view of a multiplane scanner.

FIG. 6 illustrates a perspective view of a single plane scanner 900 and FIG. 7 illustrates a perspective view of a multiplane scanner 1000. Each of the single plane scanner 900 and the multiplane scanner 1000 can be communicatively coupled to one or more downwardly directed imagers. The downwardly directed imagers may be a fixed data capture assembly positioned above the scanner. The fixed data capture assembly may have a first FOV that corresponds to one of a downwardly directed looking vision camera assembly, an infrared (IR) sensor assembly, or a lidar sensor assembly comprising at least one imager configured to scan an indicia associated with an item within an item scanning region and a second FOV that corresponds to a downwardly directed looking vision camera assembly configured to detect the item within a first data capture region (e.g., a shopping cart area, a basket area, a flatbed cart area, a countertop area, etc.). In an embodiment, the scanner may be a standalone scanner such that the upwardly directed imagers are positioned in a lower portion of the scanner and at least one downwardly directed imager (e.g., a fixed data capture assembly corresponding to a downwardly directed looking vision camera assembly configured to scan an indicia associated with an item within an item scanning region and detect the item within a first data capture region) is positioned above the scanner and is independent of the scanner. In various examples, these scanners provide a narrow profile scanner design that is of a sufficiently small form factor to allow for space between a first data capture region (e.g., a shopping cart area, a basket area, a flatbed cart area, a countertop area, etc.) and a second data capture region (e.g., a bagging area), such that a customer can quickly scan items from one region to the other, in a frictionless manner, without concern for orientation of the item, as the multiple imagers are positioned to detect barcodes on an item regardless of an orientation thereof.

As shown in FIG. 6, the single plane scanner 900 includes a housing 902, a first imaging assembly 904, a second imaging assembly 906, a window 908, and a platter 964. The single plane scanner 900 can be configured for placement in a horizontal position. The single plane scanner 900 may be a standalone scanner, or a scanner integrated into a POS station. For example, the single plane scanner 900 may be placed to function as a table top or a platter across which one or more items (not shown) are scanned. The platter 964 protects the single plane scanner 900 from items scanned across the single plane scanner 900 that are likely to come into contact with the area in which the platter 964 is located.

As shown in FIG. 7, the multiplane scanner 1000 is implemented in a POS station including the multiplane scanner 1000 and a workstation 1034 with a counter 1036. The multiplane scanner 1000 includes a weighing platter 1038. In operation, a user may pass an item 1032 across at least one of the substantially vertical window 1010 and the substantially horizontal window 1012 to enable the multiplane scanner 1000 to capture one or more images of the item 1032, including the barcode 1040.

Figure 8:
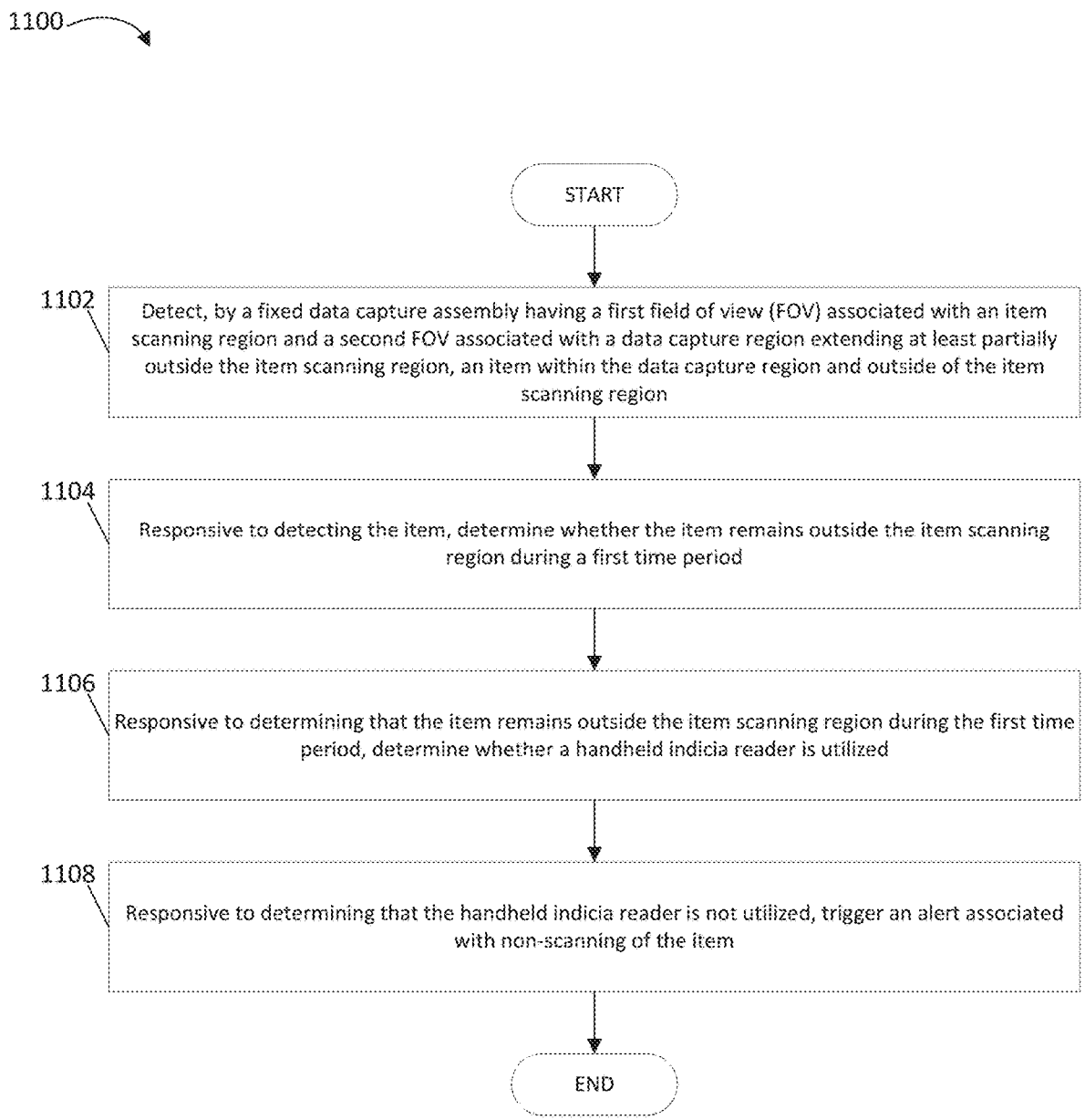
FIG. 8 is a flowchart illustrating processing steps of an embodiment of the present disclosure.

FIG. 8 is a flowchart 1100 illustrating processing steps of an embodiment of the present disclosure. Beginning in step 1102, a method detects, by a fixed data capture assembly having a first FOV associated with an item scanning region and a second FOV associated with a data capture region extending at least partially outside the item scanning region, an item within the data capture region and outside of the item scanning region. In step 1104, the method, responsive to detecting the item, determines whether the item remains outside the item scanning region during a first time period. Then, in step 1106, the method, responsive to determining that the item remains outside the item scanning region during the first time period, determines whether a handheld indicia reader is utilized. In step 1108, the method, responsive to determining that the handheld indicia reader is not utilized, triggers an alert associated with non-scanning of the item.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A system for item detection in a retail environment, comprising:
   a fixed data capture assembly having a first field of view (FOV) associated with an item scanning region and a second FOV associated with a data capture region extending at least partially outside the item scanning region;
   a handheld indicia reader;
   a processor; and
   a memory communicatively coupled to the processor, the memory storing instructions that, when executed by the processor, cause the system to:
   detect, by the processor, an item within the data capture region and outside of the item scanning region;
   responsive to detecting the item, determine whether the item remains outside the item scanning region during a first time period;
   responsive to determining that the item remains outside the item scanning region during the first time period, determine whether the handheld indicia reader is utilized; and
   responsive to determining that the handheld indicia reader is not utilized, trigger an alert associated with non-scanning of the item.

2. The system of claim 1, wherein
   the first FOV corresponds to one of a downwardly directed looking vision camera assembly, an infrared (IR) sensor assembly, or a lidar sensor assembly comprising at least one imager configured to scan an indicia associated with the item within the item scanning region; and
   the second FOV corresponds to a downwardly directed looking vision camera assembly configured to detect the item within the data capture region.

3. The system of claim 1, wherein
   the data capture region is one of a shopping cart area, a basket area, a flatbed cart area, or a countertop area, and
   the second FOV includes at least one of a partial or an entire opening of a shopping cart positioned in the shopping cart area and/or a partial or an entire bottom surface of the shopping cart positioned in the shopping cart area, a partial or an entire opening of a basket positioned in the basket area, a partial or an entire top surface of a flatbed cart positioned in the flatbed cart area, or a partial or an entire top surface of a countertop positioned in the countertop area.

4. The system of claim 1, wherein
   the first time period is associated with a scanning session within the item scanning region or a transaction session of the system; and
   the handheld indicia reader is a mobile scanner.

5. The system of claim 1, wherein the instructions, when executed by the processor, further cause the system to:
   determine whether the handheld indicia reader is utilized to scan an indicia associated with the item.

6. The system of claim 1, wherein the instructions, when executed by the processor, further cause the system to:
   display the alert on at least one of a display of the system or a display of a mobile device of a user associated with the system.

7. The system of claim 1, wherein the instructions, when executed by the processor, further cause the system to:
   responsive to determining the handheld indicia reader is utilized, detect, by processor, a position of the handheld indicia reader within the data capture region;
   determine whether the detected position of the handheld indicia reader within the data capture region corresponds to a position of the detected item within the data capture region during a scanning session of the handheld indicia reader, and responsive to determining the detected position of the handheld indicia reader within the data capture region corresponds to the position of the detected item within the data capture region during the scanning session of the handheld indicia reader, effect a transaction of the item.

8. The system of claim 1, wherein the instructions, when executed by the processor, further cause the system to:
responsive to determining the handheld indicia reader is utilized, detect, by the processor, a position of the handheld indicia reader within the data capture region;
determine whether the detected position of the handheld indicia reader within the data capture region corresponds to a position of the detected item within the data capture region during a scanning session of the handheld indicia reader, and
responsive to determining the detected position of the handheld indicia reader within the data capture region does not correspond to the position of the detected item within the data capture region during the scanning session of the handheld indicia reader, trigger the alert associated with non-scanning of the item.

9. A fixed data capture assembly for item detection in a retail environment, comprising:
a first field of view (FOV) associated with an item scanning region and a second FOV associated with a data capture region extending at least partially outside the item scanning region;
a processor; and
a memory communicatively coupled to the processor, the memory storing instructions that, when executed by the processor, cause the processor to:
detect an item within the data capture region and outside of the item scanning region;
responsive to detecting the item, determine whether the item remains outside the item scanning region during a first time period;
responsive to determining that the item remains outside the item scanning region during the first time period, determine whether a handheld indicia reader is utilized; and
responsive to determining that the handheld indicia reader is not utilized, trigger an alert associated with non-scanning of the item.

10. The fixed data capture assembly of claim 9, wherein
the first FOV corresponds to one of a downwardly directed looking vision camera assembly, an infrared (IR) sensor assembly, or a lidar sensor assembly comprising at least one imager configured to scan the indicia associated with the item within the item scanning region; and
the second FOV corresponds to a downwardly directed looking vision camera assembly configured to detect the item within the data capture region.

11. The fixed data capture assembly of claim 9, wherein
the data capture region is one of a shopping cart area, a basket area, a flatbed cart area, or a countertop area, and
the second FOV includes at least one of a partial or an entire opening of a shopping cart positioned in the shopping cart area and/or a partial or an entire bottom surface of the shopping cart positioned in the shopping cart area, a partial or an entire opening of a basket positioned in the basket area, a partial or an entire top surface of a flatbed cart positioned in the flatbed cart area, or a partial or an entire top surface of a countertop positioned in the countertop area.

12. The fixed data capture assembly of claim 9, wherein
the first time period is associated with a scanning session within the item scanning region or a transaction session within the item scanning region; and
the handheld indicia reader is a mobile scanner.

13. The fixed data capture assembly of claim 9, wherein the instructions, when executed by the processor, further cause the fixed data capture assembly to:
determine whether the handheld indicia reader is utilized to scan an indicia associated with the item.

14. The fixed data capture assembly of claim 9, wherein the instructions, when executed by the processor, further cause the fixed data capture assembly to:
display the alert on at least one of a display of the fixed data capture assembly or a display of a mobile device of a user associated with the fixed data capture assembly.

15. The fixed data capture assembly of claim 9, wherein the instructions, when executed by the processor, further cause the fixed data capture assembly to:
responsive to determining the handheld indicia reader is utilized, detect, by the processor, a position of the handheld indicia reader within the data capture region;
determine whether the detected position of the handheld indicia reader within the data capture region corresponds to a position of the detected item within the data capture region during a scanning session of the handheld indicia reader, and
responsive to determining the detected position of the handheld indicia reader within the data capture region corresponds to the position of the detected item within the data capture region during the scanning session of the handheld indicia reader, effect a transaction of the item.

16. The fixed data capture assembly of claim 9, wherein the instructions, when executed by the processor, further cause the fixed data capture assembly to:
responsive to determining the handheld indicia reader is utilized, detect, by the processor, a position of the handheld indicia reader within the data capture region;
determine whether the detected position of the handheld indicia reader within the data capture region corresponds to a position of the detected item within the data capture region during a scanning session of the handheld indicia reader, and
responsive to determining the detected position of the handheld indicia reader within the data capture region does not correspond to the position of the detected item within the data capture region during the scanning session of the handheld indicia reader, trigger the alert associated with non-scanning of the item.

17. A method for item detection in a retail environment, comprising:
detecting, by a fixed data capture assembly having a first field of view (FOV) associated with an item scanning region and a second FOV associated with a data capture region extending at least partially outside the item scanning region, an item within the data capture region and outside of the item scanning region;
responsive to detecting the item, determining whether the item remains outside the item scanning region during a first time period;
responsive to determining that the item remains outside the item scanning region during the first time period, determining whether a handheld indicia reader is utilized; and responsive to determining that the handheld indicia reader is not utilized, triggering an alert associated with non-scanning of the item.

18. The method of claim 17, wherein the first FOV corresponds to one of a downwardly directed looking vision camera assembly, an infrared (IR) sensor assembly, or a lidar sensor assembly comprising at least one imager configured to scan the indicia associated with the item within the item scanning region; and the second FOV corresponds to a downwardly directed looking vision camera assembly configured to detect the item within the data capture region.

19. The method of claim 17, wherein the data capture region is one of a shopping cart area, a basket area, a flatbed cart area, or a countertop area, and the second FOV includes at least one of a partial or an entire opening of a shopping cart positioned in the shopping cart area and/or a partial or an entire bottom surface of the shopping cart positioned in the shopping cart area, a partial or an entire opening of a basket positioned in the basket area, a partial or an entire top surface of a flatbed cart positioned in the flatbed cart area, or a partial or an entire top surface of a countertop positioned in the countertop area.

20. The method of claim 17, wherein the first time period is associated with a scanning session within the item scanning region or a transaction session within the item scanning region; and the handheld indicia reader is a mobile scanner.

21. The method of claim 17, further comprising:

determining whether the handheld indicia reader is utilized to scan an indicia associated with the item.

22. The method of claim 17, further comprising:

displaying the alert on at least one of a display of the fixed data capture assembly or a display of a mobile device of a user associated with the fixed data capture assembly.

23. The method of claim 17, further comprising:

responsive to determining the handheld indicia reader is utilized, detecting, by the data capture assembly, a position of the handheld indicia reader within the data capture region;

determining whether the detected position of the handheld indicia reader within the data capture region corresponds to a position of the detected item within the data capture region during a scanning session of the handheld indicia reader, and responsive to determining the detected position of the handheld indicia reader within the data capture region corresponds to the position of the detected item within the data capture region during the scanning session of the handheld indicia reader, effecting a transaction of the item.

24. The method of claim 17, further comprising:

responsive to determining the handheld indicia reader is utilized, detecting, by the data capture assembly, a position of the handheld indicia reader within the data capture region;

determining whether the detected position of the handheld indicia reader within the data capture region corresponds to a position of the detected item within the data capture region during a scanning session of the handheld indicia reader, and responsive to determining the detected position of the handheld indicia reader within the data capture region does not correspond to the position of the detected item within the data capture region during the scanning session of the handheld indicia reader, triggering the alert associated with non-scanning of the item.

* * * * *